United States Patent Office 2,999,782
Patented Sept. 12, 1961

2,999,782
COMPOSITE HEAT-SEALABLE WRAPPING MATERIAL
John L. Justice and Charles M. Rosser, Wallingford, Pa., assignors to American Viscose Corporation, Philadelphia, Pa., a corporation of Delaware
No Drawing. Filed July 14, 1959, Ser. No. 826,922
17 Claims. (Cl. 154—136)

The present invention relates to the anchoring of thermoplastic resins to cellulosic material. It is of especial importance in providing highly transparent regenerated cellulose films coated with a polyolefin or a resin containing primarily vinylidene chloride, which is well anchored to the base film.

This application is a continuation-in-part of application Serial No. 518,947, filed June 29, 1955, now abandoned.

Various procedures are known for coating cellophane or other base of cellulosic sheet material with hydrophobic thermoplastic resins for the purpose of rendering the base sheet moisture resistant and heat-sealable. In general, the union of a hydrophilic base with a hydrophobic thermoplastic resin is difficult to accomplish. For example, a polyethylene or polypropylene coating may be readily separated from a base sheet of cellophane to which it has been applied in molten condition. The application of an anchoring coating to the fully processed base material is undesirable since it necessitates an additional coating application. Other procedures are used in which the finished base sheet is subjected to impregnation by a solution or dispersion of the anchoring medium.

When it was found that satisfactory impregnation of the finished base sheet was difficult to obtain, later efforts were directed to the impregnation of the base sheet, while in a partly manufactured gel state, by solutions or dispersions containing polymerizable or condensable materials further polymerization of which is advanced, but controlled to an incomplete stage in completing the manufacturing of the base sheet, but is again advanced to a more complete state after or during application of the resinous coating whereupon the anchoring agent reacts chemically and physically with the coating material to establish the bonding thereof with the base sheet. In general, such solutions or dispersions require special preparation before use and, because of the aging character of the resin carried therein, must be prepared in limited quantities and used promptly.

An object of this invention is to obtain unusually strong adhesion between a non-fibrous regenerated cellulose sheet and a saran containing primarily vinylidene chloride or a polyolefin, such as polyethylene or polypropylene. It is a further object to provide a medium for anchoring such a resinous coating to a cellulosic surface without necessitating additional manufacturing operations or the use of materially modified process conditions for developing the effectiveness of the anchoring agent. Another object is to provide an anchoring medium that is chemically stable so that it may be stored for a substantial period and one which requires no special preparation just prior to use.

These objects and others ancillary thereto are achieved by impregnating the cellulosic base with a solution of a polyalkylenimine in accordance with solution concentrations and properties of the polyalkylenimine as hereinafter described prior to the application thereto of the resinous coating. Although polyethylenimine is used throughout the examples below to illustrate various aspects of the invention, homologues of polyethylenimine may be used including such polyalkylenimines as polypropylenimine, polybenzylethylenimine, polypropyleneethylenimine, and polybutylenimine.

For example, in the manufacturing of moisture-proof cellophane the regenerated cellulose base may be treated with a solution of the polyethylenimine after the base has been thoroughly dried. For this type of application, alcohol solutions of the imine appear to be most satisfactory and, as an example, may vary from 0.01 to 0.25 percent by weight in concentration in ethanol for high bonding strength and economical use of the imine.

However, the imine is applied more advantageously and with less effort by including it in the final bath usually containing the plasticizer for the base sheet while it is still in the wet gel state. Thus, the imine is applied while the washed regenerated cellulose sheet is still in the gel state and in a condition to be readily permeated by the aqueous solution in the same manner as carried out in the conventional manufacturing process wherein the plasticizing solution does not contain the polyalkylenimine. The solution contains the usual amount of plasticizer, such as about 5 percent by weight of glycerol, and from 0.05 to 5 percent by weight of polyethylenimine. Although adhesion of the resinous coating to the base is substantially improved within this range of imine concentration in aqueous solution, most marked improvement in adhesion is obtained by employing concentrations of about 0.1 to 1 percent by weight, with optimum adhesion occurring at between 0.3 and 0.4 percent by weight concentration. The strength of adhesion thus developed in cellophane samples coated with polyethylene appears to be equal to or superior to that obtained by any other presently known process.

Although the average minimum molecular weight of the polyalkylenimines is an essential factor in the practice of this invention, on account of the difficulty of its determination, viscosity values are used herein to indicate those types, for example of polyethylenimine, which are satisfactory as to molecular weight since the viscosity is directly related thereto. The viscosity values herein expressed are the specific viscosities measured on 1 percent solutions of polyethylenimine in water at 25° C. Typical of satisfactory ethylenimine polymers used were "Polymin P," manufactured by Badische Aniline and Fabric Corporation of Germany, and polyethylenimine manufactured by the Monomer Polymer Corporation. These products have specific viscosities of 0.30 and 0.23 respectively. Products which had insufficient molecular weight were indicated by specific viscosities below 0.15. At present, there is no upper limit in molecular weight in commercially obtainable water-soluble alkylenimine polymers known that would restrict their use in practicing this invention.

When manufacturing cellophane, the polyalklenimine treated gel sheet of regenerated cellulose is dried in a conventional manner in a multiple roll paper dryer. The final dried sheet contains the imine polymer uniformly dispersed or united chemically therewith throughout the cross section of the sheet. In the instance wherein an alcohol solution of imine polymer is applied to a dried cellophane sheet, the solution permeates the sheet partially or wholly, depending upon the amount applied. When applied in merely that amount sufficient to effectively wet the surface to which the resinous coating is to be applied, the deposition of the imine is greatest at the surface of the sheet and then decreases away from the surface in accordance with the thickness of the sheet. This condition corresponds to economical use of the polyalkylenimine solution.

A polyolefin, such as polyethylene, polypropylene or mixtures thereof may be deposited on the polyalkylenimine-treated base as a prefabricated film, molten film, solution, dispersion, or emulsion. For example, a preformed layer or film of polyethylene may be anchored to the imine-treated base by subjecting the base and the film to heat and pressure. Alternatively, solid powdered polyethylene may be applied to the imine-treated base which is then passed through a heating zone whereupon the powder is melted and spread uniformly over the base by a heated doctor blade. Or as another alternative, a polyethylene coating may be joined with the imine-treated base by carrying the cellophane or other sheet of cellulosic material under an extruding device which discharges upon the base a molten coating of polyethylene, following which the base and its coating pass between nip rolls, one of which has a hard polished surface and the other a resilient surface, to be formed into a composite or laminated sheet. The extruded resinous coating may be stretched between the extruder and the region at which it joins the base to obtain the desired thickness of the coating. The base and the coating in being joined between the rolls are pressed into a laminate of high gloss and transparency. After the customary aging for a day or so, the laminated sheet may be tested for strength of adhesion of the laminae. With optimum use of the polyalkylenimine, the coating or the base sheet is found in most instances to break before parting of the laminae can be obtained at their interface. The procedures followed above with respect to polyethylene or polypropylene may, in general, be used in applying the sarans as films or coatings. In addition, the saran or polyolefin coatings or resinous films may be applied to the base as solutions.

The polyalkylenimines may be advantageously used in uniting regenerated cellulose film to coatings comprising polyolefins and sarans. The sarans contemplated by this invention are those vinylidene chloride interpolymers having high impermeability to vapors generally and high vinylidene chloride/low intermonomer ratios. The commercially important binary or ternary interpolymers of high vinylidene chloride content are preferable because of their excellent resistance to moisture-vapor, oxygen, carbon dioxide and nitrogen transmission. These features of these interpolymers are said to result from strong intermolecular secondary valence forces which provide good resistance to polar as well as non-polar type vapors.

The vinylidene chloride interpolymers useful for this invention possess a vinylidene chloride content of more than 50% and up to 95% by weight of the polymeric product. As a practical matter, it is generally necessary that the vinylidene chloride content be 75% by weight or more, and in the preferred embodiment, the vinylidene chloride content is between about 85% and 95% by weight. These interpolymers having the above described vinylidene chloride content may be interpolymerized with one, two or more other monomers, preferred polymeric products being copolymers or terpolymers of vinylidene chloride and one or more monomers from the group consisting of acrylonitrile, vinyl chloride, alkyl methacrylates wherein the alkyl chain contains 8 to 18 carbon atoms as described in application Serial No. 642,939, filed February 28, 1957, alkyl acrylates as described in application Serial No. 691,829, filed October 23, 1957 and mixtures of alkyl acrylates and methacrylates as described in application Serial No. 677,781, filed August 12, 1957.

Examples of the monomeric materials suitable for the preparation of sarans suitable for the purposes of this invention include the methyl, ethyl, isobutyl, butyl, hexyl, octyl, 2-ethylhexyl, decyl, n-dodecyl and n-octadecyl methacrylates and acrylates; phenyl, cyclo-hexyl and p-cyclo-hexyl phenyl methacrylates, methoxyethyl, chloro-ethyl and 2-nitro-2-methylpropyl methacrylates, and the corresponding esters of acrylic acid; methyl and octyl alpha-chloroacrylates; phenyl vinyl, methyl isopropenyl and methyl vinyl ketones; acrylonitrile, methacrylonitrile; vinyl esters such as the chloride, acetate, propionate, chloro-acetate, and bromide; isopropenyl acetate; styrene and vinyl naphthalene; ethyl vinyl ether; N-vinyl phthalimide, succinimide, and carbazole; acrylamide, methacrylamide and monoalkyl substitution products thereof; esters such as diethyl fumarate, maleate and itaconate, methylene diethyl malonate, dimethyl and dibutyl itaconate; dichloro-vinylidene fluoride; vinyl pyridine; maleic anhydride; allyl glycidyl ether and other unsaturated aliphatic ethers described in U.S. 2,160,943; and free acids such as itaconic, acrylic and methacrylic acids.

The coatings carried by the cellulosic base sheet of this invention may be applied by melt-extrusion, or from a lacquer or emulsion of the polymeric material. In the case of the polyolefin coatings, it is preferable to apply the coating by conventional melt extrusion procedures; see U.S. Patent No. 2,686,744 or application Serial No. 729,320 filed April 18, 1958. In the case of the vinylidene chloride interpolymers it is usually more practicably to apply the coating from a lacquer or emulsion.

Among the solvents for the sarans which are presently considered satisfactory for forming coating compositions are methyl isobutyl ketone, methyl ethyl ketone, tetrahydrofuran, cyclohexanone, isophorone, dioxane, and mesityl oxide; a variety of organic diluents may be used with these solvents. Other ingredients having various functions are ordinarily mixed in the solution of the saran. For example to improve the feel and frictional properties of a saran surface which affect the satisfactory passage of a film through packaging machinery, a hydrophobic wax such as paraffin wax, carnauba, a hydrogenated vegetable or animal oil, a high molecular weight aliphatic ketone such as stearone, or a low molecular weight polyethylene may be mixed with the Saran. The waxes, particularly paraffin or the hydrogenated oils, may also improve the impermeability of the Saran to vapors. Materials for plasticizing the saran may be included in a solution thereof, such as dibutyl phthalate, ethyl diglycol phthalate, methyl phthalyl methyl glycolate, tricresyl phosphate, trioctyl phosphate, dibenzyl sebacate, and the various other phthalates, glycolates, phosphates and sebacates known to the plastic mixing art. The saran solution may also include in suspension materials which prevent the sticking of engaged saran-coated surfaces; such materials include fine particle clay, silica gel and talc and/or ester waxes.

The polyolefins used in this invention are of a variety of types, e.g. the resinous polyethylenes having molecular weights between 10,000 and 40,000 and density between 0.90 and 0.97 g./cc. Preferably the molecular weight is in the approximate range of 10,000 to 20,000 and the density in a range of about 0.91 to 0.95 g./cc. These latter ranges correspond to softening points in the range of 100° C. to 110° C. Polypropylene, on the other hand, having molecular weights of between about 10,000 and 100,000 are suitable for this invention. Preferably the polypropylene utilized according to this invention will possess molecular weights in the range of about 30,000 to 50,000, a density in the range of about 0.88 to 0.90 and a softening point in the range of about 100° to 125° C. The polyolefins, as normally used in this invention, are melt-extruded as films of polymer, or polymers, only, although they may be applied by known emulsion, solution, or powder technique and may be mixed with ingredients such as waxes, polyisobutylene and other compatible resins, dyes, pigments, and fillers, for special purposes.

The following examples, in which percentages of ingredients are by weight, illustrate preferred embodiments of the invention.

*Example 1*

A washed regenerated cellulose gel sheet is passed through a final bath containing 5 percent glycerol and 0.1 percent of polyethylenimine which has a specific viscosity (1 percent aqueous solution at 25° C.) of 0.30. Thereafter, the sheet is dried in a conventional manner and passed through a film extruding machine. A film of molten polyethylene extruded at approximately 250° C. is fed onto the cellophane. The speed of the base is adjusted relative to the extrusion rate to deposit a polyethylene film of approximately 0.001 inch thick. The hot film and base is thereupon passed between polished nip rolls of which one is polished and chilled and the other is resilient. After aging for approximately one day, test pieces 2 inches wide are cut from the laminate of film and cellophane and tested for adhesion. The forces required to separate the film from the cellophane base range from 3600 grams to 4000 grams. Test pieces are also soaked in water. The test pieces containing the imine are retained in the water 7 days and when removed show good adhesion of the laminate although somewhat less than that obtained in the dry condition. The base and film of test pieces containing no imine separate in the water within an hour.

*Example 2*

The procedure of Example 1 is repeated to obtain sheets of laminated polyethylene and cellophane of the same thicknesses except that in each instance the concentration of the polyethylenimine (Polymin P) in the final bath is different. Respective sheets of cellophane are treated in baths having concentrations (percentage by weight) of 0.3, 0.5, and 1.0. Each sheet is tested as described in Example 1 and the results stated in grams in the order of, and corresponding to, the percentages set forth in the above sentence are 6200, 5000, and 4000. From Examples 1 and 2, it thus appears that optimum adhesion is obtained within the range 0.1 to 1.0 percent of polyethylenimine in aqueous solution as applied to a regenerated cellulose sheet in the gel state. Cellophane-polyethylene sheets are prepared according to Examples 1 and 2, with the exception that the polyethylenimine used in the bath has a specific viscosity (1 percent solution at 25° C.) of 0.23, produce excellent adhesion but slightly less when comparing samples impregnated with equal concentrations of imines having a specific viscosity of 0.30. Test pieces are soaked in water for 7 days and are found to retain substantial adhesion of the laminae.

*Example 3*

Ethanol solutions containing in percent by weight 0.25%, 0.10%, and 0.025% of polyethylenimine respectively are applied to different running lengths of dry cellophane (13% by weight glycerine) by brushing. Molten polypropylene (Profax-Hercules Powder Company) is extruded at approximately 295° C. on to each of these running lengths of cellophane, as well as a length thereof containing no polyethylenimine, and the coated cellophane is further processed in the same manner as is described in Example 1. When tested for adhesion, two inch tear strips of the three polypropylene-coated films anchored with polyethylenimine require essentially the same forces as those described in Example 1 for the extruded polyethylene coatings anchored with polyethylenimine, the cellophane to which the 0.25 weight percent solution has been applied exhibiting the best adhesion properties. On the other hand, a tear strip from the cellophane which has not been treated with any polyethylenimine exhibits no measurable adhesion to its polypropylene coating.

*Example 4*

Dry cellophane sheets containing about 13 percent glycerine (dry weight basis) while held tautly in frames are brushed with a 0.025 percent solution of polyethylenimine (Polymin P) in ethyl alcohol. The cellophane sheets are sealed to unsupported polyethylene film in a heat sealing machine for 2 seconds at 28 pounds per square inch. A sheet of cellophane which has not been treated with polyethylenimine is also sealed to polyethylene film. Test pieces 2 inches wide are prepared from the laminated cellophane-polyethylene sheets. Four test pieces containing no polyethylenimine and sealed at 100° C. separate at the interface of the film and the cellophane base at an average force of 383 grams. Ten test pieces containing the imine and sealed at 90° C. separate at the interface at an average force of 866 grams. Four test pieces containing the imine but sealed at 100° C. separate at the interface at an average force of 1225 grams.

*Example 5*

Dry cellophane sheets containing about 13 percent glycerine (dry weight basis) while held tightly in frames are brushed with 0.25 percent solution of polyethylenimine (product of Monomer Polymer Corporation) in ethyl alcohol. Unsupported sections of saran film (93% by weight vinylidene chloride/7% by weight vinyl chloride copolymer) are sealed in a heat sealing machine to the imine-treated cellophane sheets and to another sheet which is not treated with polyethylenimine. Test pieces of 2 inches in width are prepared from cellophane-saran sheets and tested for strength of adhesion of the laminae. Test pieces from sheets sealed at 140° C., of which the cellophane thereof received no anchoring agent, show no measurable strength of adhesion between saran and the cellophane. Test pieces from sheets sealed at 160° C. but containing no anchoring agent are found to require an average of 100 grams to separate the saran from the cellophane. Test pieces from the sheets of which the cellophane have been imine-treated have average adhesion of 221 grams and 2933 grams from sheets heat sealed at 140° C. and 160° C. respectively.

*Example 6*

The procedure of Example 5 is carried out with respect to the adhesion of a saran film (90 vinylidene chloride—10 acrylonitrile copolymer). The application of polyethylenimine (Polymin P) to the cellophane base is found to substantially increase adhesion in all test pieces representing different temperatures of sealing the saran film to the base.

*Example 7*

The procedure of Example 5 is repeated with the exception that an 85.5% by weight vinylidene chloride/5.8% by weight decyl methacrylate/8.7% by weight octyl methacrylate terpolymer (Example VIII, application Serial No. 642,939) is substituted for the saran polymer of Example 5. Test strips exhibit adhesion strength of the same order as those of Example 5.

*Example 8*

Example 5 is again repeated, substituting an 80.5% by weight vinylidene chloride/11.7% by weight octyl methacrylate/7.8% by weight decyl methacrylate terpolymer for the polymer of Example 5. Adhesion strength of test strips are of the same magnitude as those observed in Example 5.

*Example 9*

The procedure of Example 5 is again repeated; however, a terpolymer containing about 86 to 86.5% by weight of vinylidene chloride, 5.0 to 4.8% by weight of octyl methacrylate, 3.4 to 3.3% by weight of decyl methacrylate, and 5.6 to 5.4% by weight of methyl acrylate is substituted for the vinylidene polymer of Example 5. The adhesion strength of test strips prepared therefrom is substantially the same as the adhesion strength observed in Example 5.

The resinous polymers or copolymers used in this invention include any of the polyethylenes or copolymers which are constituted predominantly of vinylidene chloride, and form films upon the base which are stable and serviceable under the usual packaging conditions. The preferred molecular weight ranges and other properties of these resins rendering them suitable for the formation of films and coatings are well known in the art. The essential problem dealt with by this invention relates primarily to bringing about adhesion of the preferred general types of resins named herein to the base material.

The materials used in the present invention are combined in order to utilize the advantages inherent in the cellulosic base material, i.e., cost, strength, and in the case of cellophane, transparency and such advantages of the vinyl film component as moisture resistance, grease resistance, abrasion resistance, and toughness. To achieve these advantages it is possible to use extremely light coatings of the resins having thicknesses, e.g., in the range of 0.1 to 1 mil. Whereas to provide independent self-supporting films of any utility from the resins herein contemplated requires, in general, thicknesses of several mils.

Thin sheet products produced in accordance with this invention are exceedingly useful as wrapping materials which are readily heat sealed without the slightest likelihood of delamination, possess high strength, have high moisture resistance, and maintain structural integrity though rigid conditions of storage. Although the polyalkylenimines exhibit high solubility in aqueous medium, the bond developed thereby joining the base and the film is strangely highly moisture-resistant. The base material is adapted to be coated on both sides with the same resin or different resins from the group herein indicated as forming strong bonds with regenerated cellulosic materials in the presence of an alkylenimine.

Various changes and modifications may be made in practicing the invention without departing from the spirit and scope thereof and, therefore, the invention is not to be limited except as defined in the appended claims.

We claim:

1. A composite wrapping material which comprises a normally hydrophilic, non-fibrous, flexible cellulosic sheet and a polyalkylenimine substantially uniformly distributed within the sheet adjacent at least one surface thereof, and a film of thermoplastic resin selected from the group consisting of polyolefins and sarans consisting predominantly of vinylidene chloride, said film being joined continuously to said sheet by anchorage to said polyalkylenimine.

2. A composite wrapping material which comprises a normally hydrophilic sheet of regenerated cellulose and a polyethylenimine substantially uniformly distributed within the sheet adjacent one surface thereof, and a film of thermoplastic resin selected from the group consisting of polyolefins and sarans consisting predominantly of vinylidene chloride, said film being joined continuously to said sheet by anchorage to said polyethylenimine.

3. The wrapping material of claim 2 wherein a 1% solution of said polyethylenimine in water at 25° C. has a specific viscosity in excess of 0.15.

4. The wrapping material of claim 3 wherein said polyolefin is polyethylene.

5. The wrapping material of claim 3 wherein said polyolefin is polypropylene.

6. The wrapping material of claim 3 wherein said saran is a polymer containing about 50 to 95% by weight of vinylidene chloride, the remainder consisting essentially of at least one other mono-olefinic monomer.

7. A composite wrapping material which comprises a normally hydrophilic sheet of regenerated cellulose and a polyalkylenimine substantially uniformly distributed throughout the sheet, and a film of thermoplastic resin selected from the group consisting of polyolefins and sarans consisting predominantly of vinylidene chloride, said film being joined continuously to a surface of the base by anchorage of the polyalkylenimine.

8. A composite wrapping material which comprises a sheet of regenerated cellulose and a polyalkylenimine substantially uniformly distributed within the sheet and constituting a dried product of a regenerated cellulose gel sheet impregnated with an aqueous solution of said imine, and a film of thermoplastic resin selected from the group consisting of polyolefins and sarans consisting predominantly of vinylidene chloride, said film being joined continuously to a surface of the sheet by anchorage to the polyalkylenimine.

9. A composite wrapping material which comprises a normally hydrophilic sheet of regenerated cellulose and a polyalkylenimine substantially uniformly distributed within the sheet adjacent one surface thereof, said sheet being a dried product of a sheet of material from said group and an alcoholic solution of the imine applied to a surface thereof, and a film of thermoplastic resin selected from the group consisting of polyolefins and sarans consisting predominantly of vinylidene chloride, said film being joined continuously to said surface of the sheet by anchorage to the polyalkylenimine.

10. A composite wrapping material which comprises a sheet of regenerated cellulose and polyethylenimine substantially uniformly distributed therethrough, said sheet being the dried product of a gel sheet of regenerated cellulose impregnated with an aqueous solution comprising by weight from 0.1 to 5 percent of said polyethylenimine, and a film of thermoplastic resin selected from the group consisting of polyolefins and sarans consisting predominantly of vinylidene chloride, said film being joined continuously to the sheet by anchorage to the polyethylenimine.

11. A method of making a composite wrapping material comprising passing a washed regenerated cellulose sheet in the gel state through a solution containing a polyalkylenimine thereby impregnating it with the solution, drying the sheet and applying thereto a film comprising a resin from the group which consists of polyolefins and sarans consisting predominantly of vinylidene chloride.

12. A method as defined in claim 11 wherein the film and the sheet are joined under conditions of elevated temperature and pressure.

13. The method as defined in claim 11 wherein the solution contains from 0.1 to 5 percent of a polyethylenimine.

14. A method as defined in claim 11 wherein the dried impregnated sheet is united under pressure with polyethylene at a temperature between 90° C. and the softening temperature of polyethylene.

15. A method as defined in claim 11 wherein the sheet is united under pressure with a saran at a temperature in the range of 140° C. to the softening point of the saran.

16. The method of claim 11 wherein the dried impregnated sheet is united under pressure with polypropylene at a temperature between 90° C. and the softening temperature of said polypropylene.

17. A method of making a composite wrapping material comprising applying to a dried hydrophilic sheet of regenerated cellulose and an alcoholic solution of a polyalkylenimine in sufficient quantity to uniformly distribute an imine within the sheet adjacent at least one surface thereof, drying the sheet, and applying to said surface a film of a thermoplastic resin selected from the group consisting of polyethylene and sarans consisting predominantly of vinylidene chloride, subjecting the film and the sheet simultaneously to elevated pressure and temperature to firmly unite the film with the polyalkylenimine as an anchoring agent thereof.

References Cited in the file of this patent

UNITED STATES PATENTS

| | | |
|---|---|---|
| 2,656,241 | Drake et al. | Oct. 20, 1953 |
| 2,770,555 | Cornwell | Nov. 13, 1956 |
| 2,828,237 | Rosser | Mar. 25, 1958 |